United States Patent
Ritter et al.

(10) Patent No.: US 8,572,705 B2
(45) Date of Patent: *Oct. 29, 2013

(54) METHOD AND SYSTEM FOR ORDERING, LOADING AND USING ADMISSION TICKETS

(75) Inventors: Rudolf Ritter, Zollikofen (CH); Eric Lauper, Bern (CH)

(73) Assignee: Icepat Ltd., Altdorf (CH)

( * ) Notice: Subject to any disclaimer, the term of this patent is extended or adjusted under 35 U.S.C. 154(b) by 191 days.

This patent is subject to a terminal disclaimer.

(21) Appl. No.: 12/844,593

(22) Filed: Jul. 27, 2010

(65) Prior Publication Data

US 2010/0293013 A1   Nov. 18, 2010

Related U.S. Application Data

(63) Continuation of application No. 11/490,238, filed on Jul. 21, 2006, now Pat. No. 7,823,193, which is a continuation of application No. 09/926,266, filed as application No. PCT/CH99/00142 on Apr. 7, 1999, now Pat. No. 7,114,179.

(51) Int. Cl.
*G06Q 10/00*  (2012.01)
*G06Q 30/00*  (2012.01)

(52) U.S. Cl.
USPC .................................................. 726/7; 705/5

(58) Field of Classification Search
USPC .................................................. 705/5; 726/7
See application file for complete search history.

(56) References Cited

U.S. PATENT DOCUMENTS

| | | | |
|---|---|---|---|
| 4,720,785 A * | 1/1988 | Shapiro | 705/13 |
| 5,189,281 A * | 2/1993 | Wyatt et al. | 219/386 |
| 5,511,108 A * | 4/1996 | Severt et al. | 379/21 |
| 5,887,266 A | 3/1999 | Heinonen et al. | |
| 5,916,024 A | 6/1999 | Von Kohorn | |
| 5,948,040 A | 9/1999 | DeLorme et al. | |
| 6,216,227 B1 | 4/2001 | Goldstein et al. | |
| 6,334,052 B1 * | 12/2001 | Nordstrand | 455/411 |
| 6,381,535 B1 * | 4/2002 | Durocher et al. | 701/423 |
| 6,453,306 B1 | 9/2002 | Quelene | |
| 6,466,919 B1 | 10/2002 | Walker et al. | |
| 6,553,346 B1 | 4/2003 | Walker et al. | |
| 6,859,650 B1 | 2/2005 | Ritter | |

(Continued)

FOREIGN PATENT DOCUMENTS

| | | |
|---|---|---|
| EP | 0 713 198 | 5/1996 |
| EP | 0 829 828 | 3/1998 |

(Continued)

OTHER PUBLICATIONS

Japanese Office Action mailed May 28, 2012 in Japanese Patent Application No. 2010-028595 (with English translation).

*Primary Examiner* — Kambiz Zand
*Assistant Examiner* — Aubrey Wyszynski
(74) *Attorney, Agent, or Firm* — Oblon, Spivak, McClelland, Maier & Neustadt, L.L.P.

(57) ABSTRACT

Method and system for ordering, loading and using tickets ordered from a reservation center through transmission of order data that includes a number assigned to a mobile communications terminal. The ordered ticket is received via a mobile radio network at the mobile communications terminal, and the ticket is stored. A reading device receives ticket information contactlessly from the mobile communications terminal, and an authorization of a user of the mobile communications terminal is decided based on the ticket information.

20 Claims, 1 Drawing Sheet

(56) References Cited

U.S. PATENT DOCUMENTS

| | | |
|---|---|---|
| 7,114,179 B1 | 9/2006 | Ritter et al. |
| 7,823,193 B2 * | 10/2010 | Ritter et al. ................ 726/7 |
| 8,165,965 B2 * | 4/2012 | Ritter ........................ 705/65 |
| 2001/0003099 A1 | 6/2001 | Von Kohorn |
| 2001/0018660 A1 | 8/2001 | Sehr |
| 2001/0018679 A1 | 8/2001 | Lee |
| 2001/0034567 A1 | 10/2001 | Allen et al. |

FOREIGN PATENT DOCUMENTS

| | | |
|---|---|---|
| EP | 0 950 968 A1 | 10/1999 |
| JP | 9-097358 | 4/1997 |
| JP | 10-069553 * | 3/1998 |
| WO | WO 98/37524 | 8/1998 |
| WO | WO 98/45823 | 10/1998 |
| WO | 98 58510 | 12/1998 |
| WO | 99 09502 | 2/1999 |

* cited by examiner

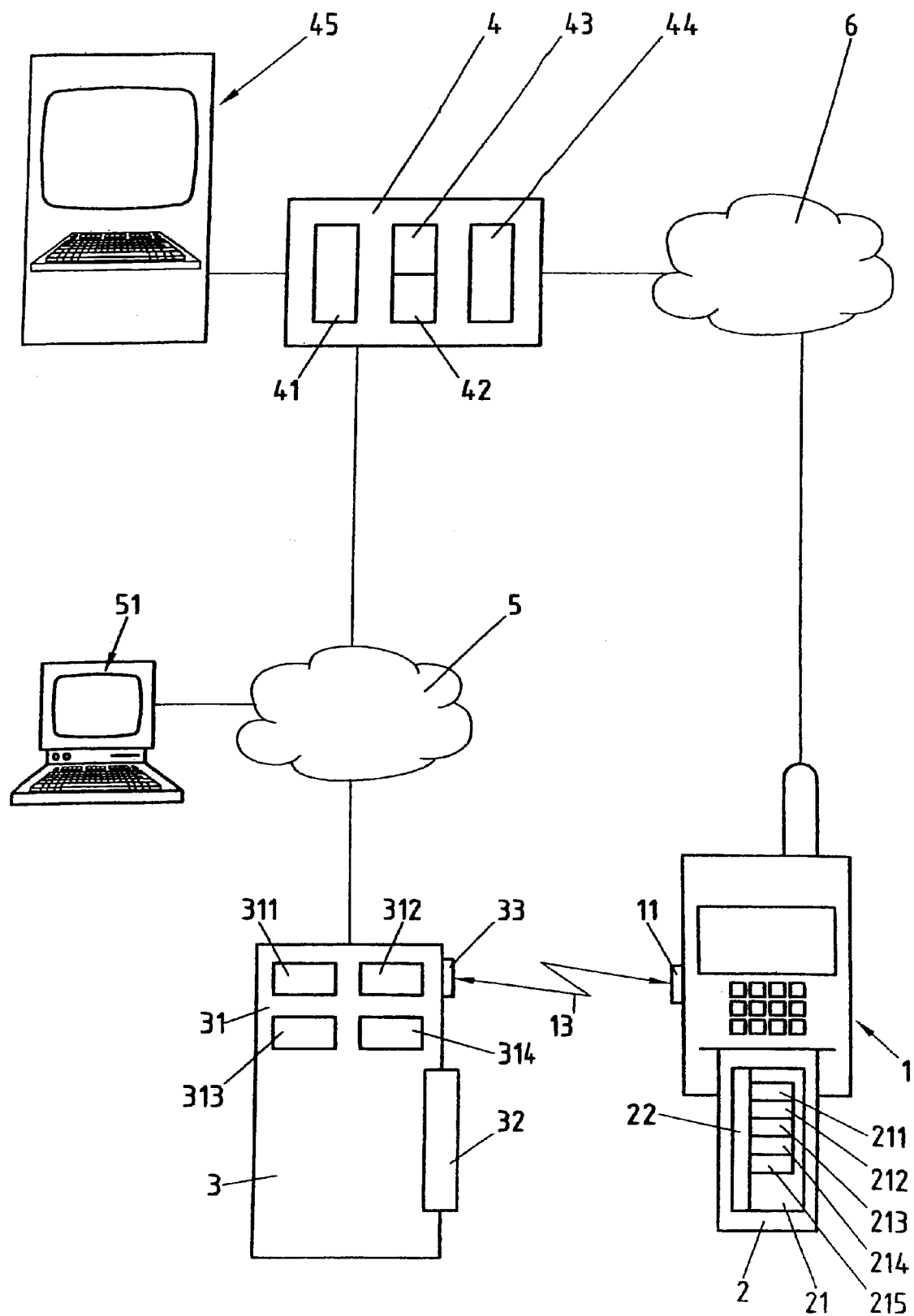

METHOD AND SYSTEM FOR ORDERING, LOADING AND USING ADMISSION TICKETS

CROSS-REFERENCE TO RELATED APPLICATIONS

The present application is a continuation of U.S. application Ser. No. 11/490,238, filed Jul. 21, 2006, now U.S. Pat. No. 7,823,193, issued Oct. 26, 2010, which is a continuation of U.S. application Ser. No. 09/926,266 filed Oct. 3, 2001, now U.S. Pat. No. 7,114,179, issued Sep. 26, 2006, which is a National Stage Application of PCT/CH99/00142, filed Apr. 7, 1999. Contents of these applications are incorporated herein by reference.

BACKGROUND OF THE INVENTION

1. Field of the Invention

This invention relates to a method and a system for ordering, loading and using admission tickets for access to access-controlled service devices.

2. Discussion of the Background

In generally known methods and systems for ordering admission tickets, the order is carried out by means of telephone call, through a mobile or fixed-installed telephone apparatus, to a reservation center, which informs the interested customer, for example by means of spoken menu presentation, about events and/or performances, and receives reservations, or respectively orders, of admission tickets from the customer via the dialing keys of his telephone apparatus. The reservations and orders are typically stored in a database and forwarded to a respective organizer, for example, who prepares the desired admission tickets for the customer to collect, or the desired admission tickets are sent to the customer directly by mail, it being possible for the billing to take place by dispatched invoice, by cash payment upon collection, or by telephone bill. Drawbacks of such methods and systems are, for example, that considerable time passes between the ordering and the handing over of the admission tickets to the customer or that it is not always ensured that admission tickets ordered are also collected.

For automated access control of access-controlled service devices, such as, for example, means of public transportation, secured buildings, halls or exhibition grounds, systems and methods are known in which reading devices are typically used that are able to read the admission tickets and which are connected to access devices that automatically open doors or barriers on the basis of the information read in the admission tickets and clear entry to respective access-controlled devices. In particular in the case of secured buildings or places of employment where the recording of working time is linked to the access control, use of personal chipcards is known which serve the authentication of persons and the automatic access control connected therewith. In general, such personal chipcards are designed in a targeted way only for this special application and, as a rule, the data, relating to persons and application specific, is only seldom changed.

Described in the patent publication DE 43 01 039 C2 is a system for administration of jointly used motor vehicles which system combines the telephone reservation described above and the access control with a personal chipcard. In the system according to DE 43 01 039 C2, the customer clarifies the reservation by telephone with a center. A computer with a reservation program transmits customer reservation data, in accordance with the reservation made, by means of a modem via the telephone network and from a fixed station with a wireless telephone to a vehicle, where they are able to be stored. The customer is equipped with a chipcard on which his customer number and an encrypted code is stored. The chipcard is inserted into a portable infrared hand apparatus that is able to communicate with a board computer. The access authorization is established through the exchange and the encryption of random numbers and, if applicable, the vehicle door opened. Inside the vehicle, the chipcard is inserted into a card reader and the authorization to drive is checked on the basis of the stored reservation data. The chipcard used as admission ticket in the system according to DE 43 01 039 C2 is designed in such a way, however, that it can only be used as an admission ticket in a targeted way for this application.

Described in the patent application EP 713 198 A2 is an electronic ticket sale system in which electronic tickets can be loaded on a chipcard by the customer at a sales terminal which has data input and data display means in exchange for electronic payment from the chipcard. According to EP 713 198 A2, the data exchange between the sales terminal and the chipcard can take place through a contactless interface or an interface having contacts. In the ticket sale system according to EP 713 198 A2, a plurality of sales terminals can be connected through communications links, in particular the telephone network, to one or more ticket sale centers, which ticket sale centers transmit the requested tickets to the sales terminal from which the tickets have been requested.

Described in the patent application WO 98/58510 is a mobile radio telephone with a removable SIM card (Subscriber Identification Module), that has at least one wireless interface, for example an inductive interface or an infrared interface, via which the SIM card is able to exchange data with an external device without using a mobile telephone network. According to WO 98/58510, the external device can be an access-control device which releases the access to a protected zone in exchange for receipt of an electronic key stored on the SIM card.

Described in the patent application WO 99/09502 is an electronic commerce system in which it is possible to order electronic tickets from a service providing system by means of a mobile radio telephone over a mobile radio network. According to WO 99/09502, the user identification of the ordering user is transmitted in the ticket order by the mobile radio telephone to the service providing system. According to WO 99/09502, the ticket order is passed on by the service providing system to a ticket issuing system, the user identification in the service providing system being replaced by a customer number of the respective user. According to WO 99/09502, the ordered ticket is subsequently transmitted by the ticket issuing system via the service providing system to the mobile radio telephone, from which the ticket order was placed, and is stored there, for example on a chipcard. According to WO 99/09502, the stored tickets can be used as admission tickets for admission to access-controlled service devices, for example in a cinema, the tickets being transmitted to the service device, for example via a contactless interface.

SUMMARY OF THE INVENTION

It is an object of the present invention to propose a new method and a new system for ordering, loading and using admission tickets for access to access-controlled service devices which in particular are able to be used in a flexible way for the most various access-controlled service devices.

According to the present invention, this object is achieved through the features of the independent claims. Further advantageous embodiments follow moreover from the dependent claims and from the description.

In particular this object is achieved through the invention in that admission tickets for access to access-controlled service devices, such as, for example, means of public transportation, secured buildings, halls or exhibition grounds, are ordered from a reservation center, through transmission of order data via an order channel, of various possible order channels, to this reservation center, the order data containing the call number of a mobile telecommunications terminal, the mobile telecommunications terminal being, for example, a mobile radio telephone or a laptop or palmtop computer with suitable communications module for mobile networks, ordered admission tickets being transmitted via a mobile network, for instance a GSM or UMTS network, to the communications terminal, to which the said call number is assigned, received admission tickets being stored in a memory module, for example on a chipcard, in particular a SIM (Subscriber Identity Module) card of the said communications terminal, data being exchanged between the memory module and a reading device of a said service device via a contactless interface, for example an infrared interface, for instance a High Speed Infrared (HSIR) interface or an IrDA (Infrared Data Association) interface, an inductive interface, e.g. a Radio Frequency Identification (RFID) interface, a home RE (Radio Frequency) interface, a Digital European Cordless Telecommunications (DECT) interface or another Cordless Telecommunications System (CTS) interface or a high frequency radio interface, for instance a so-called "Bluetooth interface," decisions about access authorization for the user of the said communications terminal being made taking into account ticket information contained in said admission tickets, and, in accordance with the decision made, access for the user to the respective service device being granted or denied through an access device connected to the said reading device. The advantage of this procedure is that admission tickets for the most various access-controlled service devices can be ordered over the most various order channels, for example in writing, by telephone with a fixed-installed telephone, with the said mobile communications terminal, by means of a dedicated input terminal, or by means of a personal communications terminal, for example via the Internet, and, independently of the order channel used and of the orderer, the ordered admission ticket is loaded in a memory module of the mobile communications terminal to which the specified call number is assigned, by means of which mobile terminal the respective user can visit a respective access-controlled service device without further effort and without time delay.

In an embodiment variant, admission tickets each contain a ticket number that is provided with a digital signature. An admission ticket stored in the memory module is transmitted to the said reading device. Access data are transmitted from the said reservation center to the said reading device, and the decision about access authorization is made taking into consideration these access data and by checking the said signature. This embodiment variant is advantageous if the data structure of the admission ticket is supposed to be kept simple and if the activities for the processing of the admission ticket are supposed to be moved into the reading device of the service device. The disadvantage consists at most in that the reading device of the service device has to be supplied with current data by the reservation center, so a communication link is necessary between the reading device of the service device and the reservation center.

In an alternative embodiment variant, the admission tickets contain ticket information about at least one access-controlled service device, for example the identity of a theater or a sports stadium, the date of a performance, or respectively of a sports event; the decision about access authorization is made taking into consideration this ticket information, and in the case of a positive decision the admission ticket stored in the memory module is marked as used. The advantage of this variant consists in that access-controlled service devices do not have to be updated with current data, and therefore can be set up autonomously without communication link.

In a first sub-variant of the last-mentioned embodiment variant, ticket information is transmitted to the said reading device, and the decision about access authorization for the respective user is made in this reading device. In a second sub-variant of the last-mentioned embodiment variant, the reading device transmits a clear device identification to the respective communications terminal; the decision about access authorization for the respective user is made in this communications terminal taking into consideration in addition the said device identification, and the result of this decision is transmitted to the said reading device. The second sub-variant is advantageous above all when the reading device of the access-controlled service device is supposed to be designed as simple as possible, in particular without networking of the reading device.

In an embodiment variant, at least certain admission tickets are assigned to a particular user, and with the decision about access authorization it is checked whether a respective certain admission ticket is assigned to the user, who is identified through a user identification in the memory module. In an embodiment variant, the reading device transmits a digitally signed, unambiguous device identification to the communications terminal, and the reading device is authenticated in the communications terminal on the basis of this device identification before data stored in the memory module are transmitted to the reading device. This has the particular advantage that admission tickets are not received, or respectively marked as used, by unauthorized reading devices.

In an embodiment variant, following a positive authentication of the reading device, a user identification stored in the memory module is transmitted with a digital signature to the reading device, and the reading device authenticates the user of the said communications terminal on the basis of this user identification.

In an embodiment variant, following a positive decision by the reading device, an access confirmation is transmitted to the said memory module regarding successful admission. This has the advantage that the respective user is able to prove at a later point in time the access to the respective service device on the basis of this admission confirmation.

In an embodiment variant, the said contactless interface is supplied with energy by the said reading device, for example by means of induction. This has the particular advantage that an exchange of data between the memory module and the reading device can take place even with turned-off communications terminal.

In addition to the method according to the invention, the invention also relates to a suitable system for execution of this method.

BRIEF DESCRIPTION OF THE DRAWING

An embodiment of the present invention will be described in the following on the basis of an example. The example of the embodiment is illustrated by the single, attached figure, wherein:

FIG. 1 is a schematic block diagram that presents a communications terminal which is connected via a mobile network to a reservation center and is able to communicate with the reading device of an access-controlled service device via a contactless interface.

DESCRIPTION OF THE PREFERRED EMBODIMENTS

An interested customer is able to order admission tickets for the most various access-controlled service devices 3, such as, for example, public transportation means, performing arts buildings (e.g. theaters or opera houses), performance halls (e.g. cinemas or concert halls) or premises for events (e.g. trade fair premises or sports premises) through transmission of order data over the most various order channels. The reference number 45 relates to an input terminal which is connected to a reservation center 4 via a communications link. Such an input terminal 45 could be set up at places accessible to the public, for instance in public telephone booths (public phones), at shopping centers, in railway stations or in other publicly accessible places that are frequented by many people, and can be used by interested customers, for example, to order admission tickets from the reservation center 4. The reference number 51 relates to a personal communications terminal, for example a personal computer with communications modules which is connected to the reservation center 4 via a telecommunications network 5, for example the public switched telephone network or the Internet, and is able to be used by interested customers to order admission tickets from the reservation center 4. Mentioned here as further possibilities for order channels should be personal verbal ordering at a counter or ticket window of the operator of the reservation center 4 or a special marketing organization, telephone calls with verbal ordering or ordering with spoken menu presentation or with speech recognition or also by written order or ordering by means of a mobile communications terminal 1 via a mobile network 6 (for instance verbally or by means of SMS or USSD messages), in the case of the verbal and written variants subsequent data entry by data typists of the reservation center 4 being possibly necessary. The order data transmitted by the interested user to the reservation center 4 comprise, for instance, indications about a specific event, for example a theatre premiere at the city theater on the 13$^{th}$ of May at 8 p.m., indications about the desired seating row or, if applicable, the transportation class, the number of tickets desired, indications about the type of ticket, for instance tickets in a person's name, multiple tickets (subscriptions, day passes, weekly passes, etc.) or transferable tickets, indications about mode of payment, for instance through written invoice by mail, by credit card with indication of the credit card number, billing by way of the telephone bill or, if applicable, by cash payment, etc. Indicated in addition in the order data with each order is the call number of (at least) one mobile communications terminal, for example the MSISDN number (Mobile Subscriber ISDN number), on which the ordered admission tickets are supposed to be loaded.

The transmitted order data are received in the reservation center 4 by an order module 41, and are stored in a database of the reservation center 4. The reservation center 4 is implemented, for example, on a conventional communications server which has at its disposal hardware and software components to connect with mobile networks 6 and fixed networks 5 and to communicate over them. The reservation center 4 has at its disposal function modules, for example the already mentioned order module 41 or further function modules that are described in the following paragraphs and which are implemented, for instance, as programmed software. In accordance with the obtained order data, a transmission module 44 of the reservation center 4 transmits admission tickets over the mobile network 6, for example a GSM (Global System for Mobile Communication), a UMTS network (Universal Mobile Telephone System) or another mobile network, to the mobile communications terminal 1 specified through the above-mentioned call number, for instance a mobile radio telephone or a laptop or palmtop computer with suitable communications module for mobile networks 6.

The transmission of admission tickets by the reservation center 4 to communications terminals 1 takes place, for example, according to the SICAP method described in the patent document EP 0 689 368 B1, the reservation center 4 having at its disposal a short message service center (SMSC) for this purpose, for example. According to the SICAP method, transmitted in addition to the standard header in so-called SMS short messages are special codes which indicate a special service and are recognized in the identification modules of mobile communications terminals, for instance by means of suitable filters, and are processed in accordance with the special code according to a special procedure. The transmission can also take place in another way, for instance by means of USSD messages (Unstructured Supplementary Services Data) or via a data link.

The transmitted admission tickets are received in the respective mobile communications terminal 1, and are stored there, by a loading module 211, in a memory module 21, for instance on an SIM card (Subscriber Identification Module) of the mobile communications terminal 1. The loading module 211 is, for example, a special procedure activated according to the SICAP method, as mentioned above, which is implemented for instance as a programmed software module on the identification module of the mobile communications terminal 1, which is, e.g. a chipcard 2, in particular a SIM card 2 with a processor 22 and a memory module 21.

Depending upon the embodiment variant and/or application, admission tickets each contain a ticket number that is provided with a digital signature, for example, or they contain ticket information about at least one access-controlled service device 3, for instance the identity of a theater or a sports stadium and the date of a performance, or respectively a sporting event, and, if applicable, further additional information, such as a reserved seating row or seat number, or, particularly for multiple tickets, a duration of validity or period of validity as well as a number of authorized admissions, if applicable. A respective customer is preferably able to check (in particular) the detailed marking of an admission ticket on the display of his mobile communications terminal 1, as if he had a physical admission ticket. Admission tickets can be loaded, for example, in the form of small program applications, so-called applets, on chipcards 2, which are able to handle such applets, for instance a so-called Java card (Java is a registered trademark of SUN Microsystems). Such applets, for example, can be automatically erased during marking as used, which will be described later.

The user of a mobile communications terminal 1 approaches, with his mobile communications terminal 1, a reading device 31 of an access-controlled service device 3, for which he has an admission ticket stored in a memory module 21 of the mobile communications terminal 1. Described in the following paragraphs will be different embodiment variants for the process during the ticket check between the mobile communications terminal 1 and the reading device 31 of the access-controlled service device which all have in common the exchange of data via a contactless interface 13 between the mobile communications terminal 1 and the reading device 31, for which the reading device 31 and the mobile communications terminal 1 are designed with suitable transceivers 33, respectively 11. These receivers 11, 33 are suited, for example, for an infrared interface, for example a High Speed Infrared (HSIR) interface or an IrDA (Infrared Data Association) interface, an inductive interface, for instance a Radio Frequency Identification (RFID) interface or a Home RE (Radio Frequency) interface, the inductive interface operating, for example, with a frequency situated at 13.56 MHz, a Digital European Cordless Telecommunications (DECT) interface or another Cordless Telecommunications System (CTS) interface, or a high frequency radio interface, for example a so-called "Bluetooth interface." Depending upon the type of contactless interface, the suitable transceiver in the mobile communications terminal 1 can be integrated in the housing or on the identification module 2 of the communications terminal 1. For the data exchange with the reading device 31 via this contactless interface 13, the mobile communications terminal 1 has a communications module 212, that is implemented, for instance, as a programmed software module on the identification module 2 of the mobile communications terminal 1, which is, for example, a SIM card 2 with a processor 22 and a memory module 21. In all described embodiment variants, the decision about access authorization for a respective user of a mobile communications terminal 1 is made in a decision-making module 213, 312, the user being granted or refused access to the respective access-controlled service device 3, in accordance with the decision made, by means of an access device 32, connected to the reading device 31, for example an automatic door or barrier or a signal light or another suitable device.

In a first embodiment variant with admission tickets that each contain a ticket number that is provided, for example, with a digital signature, an admission ticket stored in the memory module 21 is transmitted to the reading device 31. The reading module 31 is supplied with current access data by an updating module 42 of the reservation center 4, for example a programmed software module, which data are stored in a table 43 in the reservation center 4. The transmission of these access data takes place over a telecommunications network 5, for instance a fixed network, for example the public switched telephone network, the Internet, a LAN (Local Area Network) or WAN (Wide Area Network), or a mobile network. The supply of the reading device 31 with current access data takes place, for example, periodically or upon query by the reading device 31. The access data contain, for example, additional ticket information for a certain ticket number or for all the access tickets reserved for the respective access-controlled service device 3. Such ticket information includes, for instance, indications about a particular performance, such as time and place, about a reserved seat, such as seat number or row, and possibly data and/or identification information relating to the access-authorized user. According to this first embodiment variant, the decision about access authorization for the respective user is made by the decision-making module 312 of the reading device 31, for example a programmed software module, taking into account the access data corresponding to the respective ticket number and by checking the above-mentioned digital signature. In this embodiment variant, access tickets that have been used for authorized access to a respective access-controlled device 3, can be marked as used, for example through updating of the access data stored in the reservation center 4, which has been informed accordingly by the reading device 31, for instance.

In a second embodiment variant with access tickets which each contain ticket information about at least one access-controlled service device 3, decisions about access authorization are made in the decision-making modules 213, 312 taking into account this ticket information. In this second embodiment variant, the mobile communications terminals 1 each contain a canceling module 214, for example a programmed software module, for instance in the memory module 21 of the SIM card 2, which module, in the case of a positive decision, marks as used the respective admission ticket stored in the memory module 21, only one access authorization accordingly being marked as used in the case of multiple tickets. In this embodiment variant, the decision can be made, in a first sub-variant, by a decision-making module 312 in the reading device 31, for instance with the aid of additional data, such as, for example, a reference clock, after the admission ticket has been transmitted, as described above, by the mobile communications terminal 1 via the contactless interface 13 to the reading device 31, the reading device 31 commanding, via the contactless interface 13, the above-mentioned cancelling module 214 to mark the respective ticket as used following a positive decision. In a second sub-variant, the reading device 31 contains an identification module 314, by means of which the reading device 31 identifies itself with the respective mobile communications terminal in that the identification module 314, for instance a programmed software module, transmits by means of the transceiver 33 an unambiguous device identification via the contactless interface to this mobile communications terminal 1. In this second sub-variant, the admission ticket does not need to be transmitted to the reading device 31 since the decision about access authorization for the respective user is made in the decision-making module 213 of the mobile communications terminal 1, additionally taking into account the device identification received from the reading device 31, the decision-making module 213 being, for instance, a programmed software module in the memory module 21 of the SIM card 2, and the result of the decision-making being transmitted via the contactless interface 13 to the reading device 31.

It should be mentioned here that the data exchange between the memory module 21 of the mobile communications terminal 1 and the reading device 31 can also take place with turned-off communications terminal 1 if the components necessary for the data transfer, in particular the contactless interface, are supplied externally by the reading device 31, for example by means of induction of a magnetic coil of the mobile communications terminal 1, for instance in the housing or in the interior of the communications terminal 1, e.g. on the SIM card 2. The protocol used for the data exchange can specify, for example, that the initiation of a respective dialog between the mobile to communications terminal 1 and the reading device 31 is started by the mobile communications terminal 1 through transmission of an initiation sequence.

In an embodiment variant, certain admission tickets are assigned to a particular user, i.e. the mentioned ticket information or the access data stored in the table 43 of the reservation center 4 contain identification data about the assigned, authorized user, for instance his IMSI number (International Mobile Subscriber Identity) or his IDUI (International Debit User Identification). Consequently, with the decision about the access authorization, it is also checked whether a respective admission ticket is assigned to the user, who is identified through an identification stored in the memory module 21, for instance on the SIM card 2. If this check is carried out in the reading device 31, for instance in the decision-making module 312, the user identification stored in the memory module 21 is transmitted via the contactless interface 13 to the reading device 31. If, on the other hand, this check takes place in the mobile communications terminal 1, for instance in the decision-making module 213, the user identification stored in the memory module 21 does not have to be transmitted to the reading device 31.

In an embodiment variant, the reading device 31 always transmits, via the contactless interface 13, a digitally signed unambiguous device identification to the mobile communications terminal 1, for example as a reply to an initiation sequence, mentioned above, which starts the dialog between the reading device 31 and the mobile communications terminal 1. On the basis of this digitally signed device identification, the reading device 31, or respectively the associated access-controlled service device 3, is able to be authenticated through an authentication module 215 of the mobile communications terminal 1, the authentication module 215 being, for instance, a programmed software module, e.g. on the memory module 21 of the SIM card 2. This makes it possible for admission tickets not to be received, or respectively marked as used, by unauthorized reading devices 31 since data stored in the memory module 21 are not transmitted to the reading device 31 until this reading device 31 has been clearly identified. In a similar way, the reading device 31 is able to authenticate a respective user in that, for example following a positive authentication of the reading device 31, a user identification stored in the memory module 21 is transmitted with a digital signature via the contactless interface 13 to the said reading device 31 from the mobile communications terminal 1, e.g. through the authentication module 215, and is authenticated there by the authentication module 311 of the reading device 31, e.g. a programmed software module.

In an embodiment variant, after a positive decision has been made, an access confirmation, for acknowledgement of the successful access to the access-controlled service device 3, is transmitted by a confirmation module 313 of the reading device 31, e.g. a programmed software module, via the contactless interface 13, to the mobile communications terminal 1, and is stored there in the memory module 21 of the SIM card 2. On the basis of this access confirmation, which is preferably provided with a digital signature by the confirmation module 313 of the reading device 31, the respective user is able to prove the access to the respective service device 3, for example at a later point in time.

It should be mentioned here that the mobile communications terminal 1, in particular the memory module 21 of the SIM card 2, can have additional software functions that make it possible for an admission ticket stored in the memory module 21 of a first mobile communications terminal 1 to be able to be transmitted to the memory module of a second mobile communications terminal 1, for example by means of the transceiver 11 via the contactless interface 13, or via the mobile network 6, e.g. by means of SMS or USSD messages, or via another suitable connection between the first and the second mobile communications terminal. In a similar way, it is also possible moreover for an admission ticket stored in the memory module 21 of a mobile communications terminal 1 to be able to be transmitted to an external chipcard, which itself has a contactless interface, for instance in the form of an integrated electro-magnetic coil, or which is connected to the communications terminal 1 for this purpose via a (second) interface having contacts; so-called dual-slot mobile devices are already available on the market.

One skilled in the art will understand that for secured transmission and for ensuring the authenticity (genuineness) of the admission tickets and of other wirelessly transmitted identifications, for example the mentioned device identification or user identification, the mobile communications terminal 1, in particular the memory module 21, and the reading device 31 are equipped with the necessary functions for suitable signing and/or enciphering methods, for example programmed software functions. It is also possible that confidential authorities are involved in the authentication, for example when using the aid of TTP (Trusted Third Party) services, e.g. for the digital signing of identification numbers and/or admission tickets.

The billing of ordered admission tickets can take place through the reservation center 4, for example, according to the mode of payment desired by the respective user.

The area of application of the present invention is very large, and is in no way limited only to the application examples given.

Besides the sale, licensing and operation of described whole systems, it can also be interesting to sell or lease data carriers with programmed software modules stored thereon, which control a conventional communications server in such a way that it acts as a described reservation center 4, or which enable a mobile communications terminal 1 to take part in the method described, in particular in the embodiment as SIM card. Moreover the sale, leasing or the operation of reading devices 31 for access-controlled service devices 3 can also be very interesting economically. Even the sale, the leasing or the operation of input terminals 45 can be worthwhile.

The invention claimed is:

1. A method for ordering, loading, and using tickets, the method comprising:
   ordering a ticket from a reservation center through transmission of order data to the reservation center, the order data including a number assigned to a mobile communications terminal;
   receiving the ordered ticket via a mobile radio network at the mobile communications terminal to which the number included in the order data is assigned;
   storing the ticket in a memory module of the mobile communications terminal;
   receiving contactlessly at a reading device ticket information from the mobile communications terminal; and
   deciding about an authorization of a user of the mobile communications terminal based on the ticket information.

2. The method of claim 1, further comprising showing the ticket on a display of the mobile communications terminal.

3. The method of claim 1, further comprising checking the ticket on a display of the mobile communications terminal.

4. The method of claim 1, wherein the ticket information is received at the reading device from the mobile communications terminal via a contactless interface.

5. The method of claim 1, wherein the deciding about the authorization of the user is performed in the reading device.

6. The method of claim 1, wherein the deciding includes deciding about the user's authorization for at least one of public transportation, art performance, theater, opera, cinema, concert, trade fair, exhibition, sports event, and building access.

7. The method of claim 1, wherein the ticket is assigned to a particular user; and the deciding about the authorization of the user includes checking whether the ticket is assigned to the user, who is identified through a user identification stored in the memory module.

8. The method of claim 1, wherein the ordering of a ticket from the reservation center comprises including in the order data a call number assigned to the mobile communications terminal; and the ordered ticket is received via the mobile radio network at the mobile communications terminal to which the call number included in the order data is assigned.

9. The method of claim 1, further comprising granting or denying access to the user in accordance with the deciding.

10. A system for ordering, loading and using tickets, the system comprising:
- a reservation center which includes
  - an ordering module configured to receive via a telecommunications network order data for a ticket, the order data including a number assigned to a mobile communications terminal, and
  - a transmission module configured to transmit the ordered ticket via a mobile radio network to the mobile communications terminal to which the number included in the order data is assigned, for storing the ticket in a memory module of the mobile communications terminal;
- a reading device configured to receive contactlessly ticket information from the mobile communications terminal; and
- a decision-making module configured to decide about an authorization of a user of the mobile communications terminal based on the ticket information.

11. The system of claim 10, wherein the mobile communications terminal is configured to show the ticket on a display of the mobile communications terminal.

12. The system of claim 10, wherein the reading device comprises a contactless interface for receiving the ticket information from the mobile communications terminal.

13. The system of claim 10, wherein the decision-making module is arranged in the reading device.

14. The system of claim 10, wherein the decision-making module is configured to decide about the user's authorization for at least one of public transportation, art performance, theater, opera, cinema, concert, trade fair, exhibition, sports event, and building access.

15. The system of claim 10, wherein the ticket is assigned to a particular user; and the decision-making module is configured to check whether the ticket is assigned to the user, who is identified through a user identification stored in the memory module.

16. The system of claim 10, wherein the order data includes a call number assigned to the mobile communications terminal; and the transmission module is configured to transmit the ordered ticket to the mobile communications terminal to which the call number included in the order data is assigned.

17. The system of claim 10, wherein the memory module of the mobile communications terminal includes a SIM card.

18. The system of claim 10, further comprising an access device configured to grant or deny access to the user in accordance with the deciding.

19. A method for ordering, loading, and using tickets, the method comprising:
- ordering a ticket from a reservation center through transmission of order data to the reservation center, the order data including a number assigned to a mobile communications terminal;
- receiving the ordered ticket via a mobile radio network at the mobile communications terminal to which the number included in the order data is assigned;
- storing the ticket in a memory module of the mobile communications terminal;
- receiving contactlessly at a reading device ticket information from the mobile communications terminal; and
- deciding, in the reading device, based on the ticket information, for a user of the mobile communications terminal the user's authorization for at least one of public transportation, art performance, theater, opera, cinema, concert, trade fair, exhibition, sports event, and building access.

20. A system for ordering, loading and using tickets, the system comprising:
- a reservation center which includes
  - an ordering module configured to receive via a telecommunications network order data for a ticket, the order data including a number assigned to a mobile communications terminal, and
  - a transmission module configured to transmit the ordered ticket via a mobile radio network to the mobile communications terminal to which the number included in the order data is assigned, for storing the ticket in a memory module of the mobile communications terminal;
- a reading device configured to receive contactlessly ticket information from the mobile communications terminal; and
- a decision-making module configured to decide, based on the ticket information, for a user of the mobile communications terminal the user's authorization for at least one of public transportation, art performance, theater, opera, cinema, concert, trade fair, exhibition, sports event, and building access.

* * * * *